US009967297B1

(12) United States Patent
O'Twomney et al.

(10) Patent No.: US 9,967,297 B1
(45) Date of Patent: *May 8, 2018

(54) GENERATING ITEM SUGGESTIONS FROM A PROFILE-BASED GROUP

(71) Applicant: Amazon Technologies, Inc., Seattle, WA (US)

(72) Inventors: Jennifer R. O'Twomney, Seattle, WA (US); Maren Marie Costa, Seattle, WA (US); Aaron M. Donsbach, Seattle, WA (US); Devraj Varadhan, Bellevue, WA (US); Marina A. Pai, Issaquah, WA (US); Michael Crutcher, Seattle, WA (US); Sean M. Scott, Sammamish, WA (US); Anoop Balakrishnan, Seattle, WA (US); Ryuichi Hirano, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/737,910

(22) Filed: Jun. 12, 2015

Related U.S. Application Data

(63) Continuation of application No. 13/172,374, filed on Jun. 29, 2011, now Pat. No. 9,076,172.

(51) Int. Cl.
| | |
|---|---|
| *G06F 15/16* | (2006.01) |
| *H04L 29/06* | (2006.01) |
| *G06F 17/30* | (2006.01) |
| *G06F 3/0484* | (2013.01) |
| *G06F 3/0482* | (2013.01) |

(52) U.S. Cl.
CPC .......... *H04L 65/403* (2013.01); *G06F 3/0482* (2013.01); *G06F 3/04842* (2013.01); *G06F 17/30038* (2013.01); *G06F 17/3097* (2013.01); *G06F 17/30867* (2013.01); *H04L 67/42* (2013.01)

(58) Field of Classification Search
CPC ... H04L 65/403; H04L 67/42; G06F 3/04842; G06F 17/30867; G06F 3/0482; G06F 17/30038; G06F 17/3097
See application file for complete search history.

(56) References Cited

U.S. PATENT DOCUMENTS

| | | | | | |
|---|---|---|---|---|---|
| 5,963,965 | A | * | 10/1999 | Vogel | ................ G06F 17/30696 707/999.003 |
| 6,049,777 | A | * | 4/2000 | Sheena | ............. G06F 17/30699 705/26.2 |
| 6,901,379 | B1 | * | 5/2005 | Baiter | ................ G06Q 30/0643 434/395 |

(Continued)

Primary Examiner — Michael A Keller
(74) Attorney, Agent, or Firm — Thomas | Horstemeyer, LLP (57) ABSTRACT

Disclosed are various embodiments relating to generating profile-based groups to obtain suggestions regarding a topic. Third party profiles corresponding to third party users are identified based on a similarity to a profile associated with a client device of a user. A network page that is configured to facilitate discussion regarding a topic is generated and transmitted to a client device and third party devices associated with the third party users. Suggestions regarding the topic may be received from the third party devices via the network page.

19 Claims, 5 Drawing Sheets

(56) References Cited

U.S. PATENT DOCUMENTS

| | | | |
|---|---|---|---|
| 8,935,192 B1* | 1/2015 | Ventilla | G06N 5/04 706/45 |
| 9,076,172 B1 | 7/2015 | O'Twomney et al. | |
| 2003/0065578 A1 | 4/2003 | Peyrelevade et al. | |
| 2005/0043996 A1* | 2/2005 | Silver | G06Q 10/02 705/15 |
| 2005/0086204 A1 | 4/2005 | Coiera et al. | |
| 2006/0020593 A1 | 1/2006 | Ramsaier et al. | |
| 2006/0195362 A1 | 8/2006 | Jacobi et al. | |
| 2006/0218046 A1 | 9/2006 | Carfi et al. | |
| 2007/0064626 A1 | 3/2007 | Evans | |
| 2008/0103913 A1 | 5/2008 | Leach et al. | |
| 2008/0115080 A1* | 5/2008 | Matulic | G06F 17/30253 715/778 |
| 2008/0209343 A1 | 8/2008 | Macadaan et al. | |
| 2008/0222295 A1 | 9/2008 | Robinson et al. | |
| 2009/0100047 A1 | 4/2009 | Jones et al. | |
| 2009/0228342 A1 | 9/2009 | Walker et al. | |
| 2010/0179961 A1* | 7/2010 | Berry | G06F 17/30908 707/769 |
| 2010/0265311 A1 | 10/2010 | Carpenter, Jr. et al. | |
| 2010/0332283 A1 | 12/2010 | Ng et al. | |
| 2011/0184780 A1 | 7/2011 | Alderson et al. | |
| 2011/0252014 A1 | 10/2011 | Mital et al. | |
| 2011/0258073 A1 | 10/2011 | Lifson | |
| 2011/0258086 A1* | 10/2011 | Stein | G06Q 30/0603 705/27.2 |

\* cited by examiner

GENERATING ITEM SUGGESTIONS FROM A PROFILE-BASED GROUP

CROSS-REFERENCE TO RELATED APPLICATIONS

This application is a continuation of and claims the benefit of U.S. patent application Ser. No. 13/172,374, entitled "GENERATING ITEM SUGGESTIONS FROM A PROFILE-BASED GROUP," and filed Jun. 6, 2011, which is hereby incorporated by reference in its entirety.

BACKGROUND

People often purchase clothing items or accessories online in their own homes. However, often times they are not able to obtain suggestions from a group of people similar to themselves.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Various embodiments of the present disclosure relate to generating profile-based groups to obtain item suggestions when purchasing clothing items or accessories through an electronic commerce system. A user with a user account with one or more profiles may wish to create a group to obtain suggestions from others having one or more profiles similar to that of the user. To do so, the user may generate a group request by specifying a topic and selecting third parties having profiles that are similar to, or otherwise aligned with, one or more profiles of the user. In response to the group request, the third parties may input suggestions for the user and members of the group to view. In the following discussion, a general description of the system and its components is provided, followed by a discussion of the operation of the same.

Figure 1:
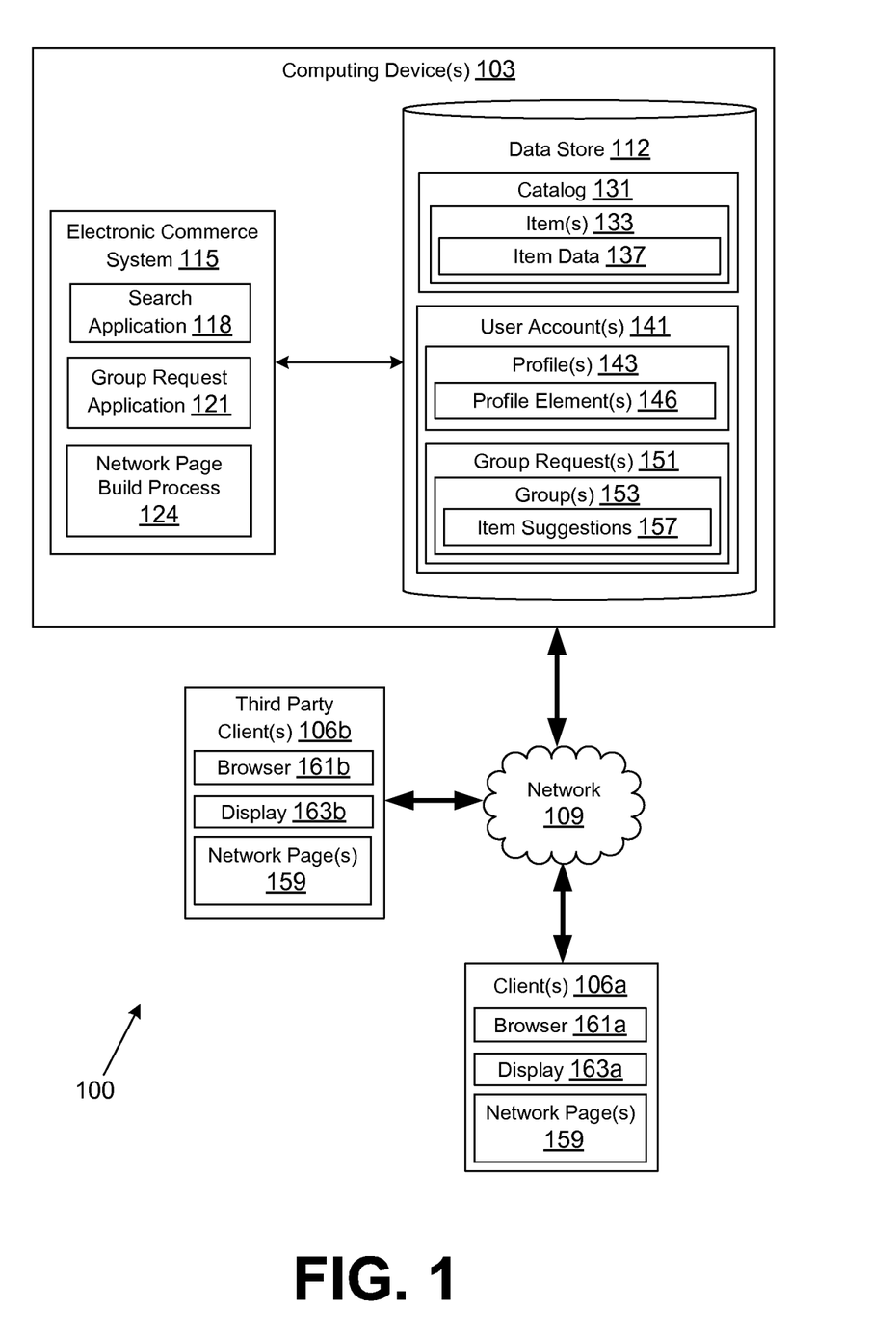
FIG. 1 is a drawing of a networked environment according to various embodiments of the present disclosure.

With reference to FIG. 1, shown is a networked environment 100 according to various embodiments. The networked environment 100 includes a computing device 103, clients 106a, third party clients 106b, and a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103, for example, include an electronic commerce system 115 and other applications, services, processes, systems, engines, or functionality not discussed in detail herein. The electronic commerce system 115 includes various components such as a search application 118, a group request application 121, a network page build process 124, and other applications and/or processes.

The electronic commerce system 115 is executed in order to facilitate the online purchase of items 133, such as, goods and/or services, over the network 109. The electronic commerce system 115 also performs various back-end functions associated with the online presence of a merchant in order to facilitate the online purchase of items 133 as will be described. For example, the electronic commerce system 115 may generate various network pages 159, such as web pages, or other types of network content, using the network page build process 124, that are provided to clients 106a and third party clients 106b for the purposes of selecting items 133 for purchase, rental, download, lease, or other form of consumption as will be described. The electronic commerce system 115 further includes a search application 118 and/or other applications useful to facilitate searching through a catalog of items to conduct electronic commerce.

The group request application 121 generates one or more network pages 159 in order to obtain item suggestions from a user and one or more third party users associated with one or more third party profiles as will be described. As used herein, the term "third party" refers to customers other than a subject user, as will be described. The group request application 121 may also generate one or more additional network pages 159 to view item suggestions as discussed below.

The data stored in the data store 112 includes, for example, a catalog 131 of items 133, user accounts 141, and potentially other data. The catalog 131 includes a listing of items 133 that are described by item data 137 and offered for sale by an online merchant. As used herein, the term "item" 133 may refer to a product, good, service, bundle of products, goods and/or services that may be offered for sale, purchase, rental, lease, download, and/or any other form of consumption, as can be appreciated. The item data 137 describes each of the items 133 and may comprise, for example, titles, descriptions, quantities, images, representations, options, weights, customer reviews, customer ratings, keywords, tags, shipping restrictions, prices, tax classifications, categories, unique identifiers, and any other data related to items 133.

Each user account 141 is associated with a respective user and may include a shipping address, an electronic mail (e-mail) address, shipping information, payment information, a purchasing history, a browsing history, and other data related to the user. In addition, each of the user accounts 141 may comprise one or more profiles 143 created by the user. In one embodiment, each of the profiles 143 is associated with, or describes, for example, a role of a given user and may comprise profile elements 146 that may include text, images, ratings, scores, and potentially other data that describes the profile 143.

Additionally, a user may generate a group request 151 in order to create a group 153 to generate item suggestions 157 from one or more third party users associated with one or more third party profiles 143 as will be described. In one embodiment, the group 153 and the item suggestions 157 may be stored in association with the user accounts 141 of the user and third party users of the group 153.

Lastly, the client 106a and third party client 106b are representative of a plurality of client devices that may be coupled to the network 109. The client 106a and third party client 106b may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client 106a and third party client 106b may be configured to execute various applications such as a browser 161a and browser 161b, respectively, and/or other applications. The browser 161a and browser 161B may be executed in a client 106a or third party client 106b, respectively, for example, to access and render network pages 159, such as, web pages, or other network content served up by the computing device 103 and/or other servers. Alternatively, a mobile application may be executed in a client 106a or a third party client 106b to generate and render user interfaces using data served up by the computing device 103 and/or other servers. Alternatively, when rendered, the network pages 159 generate a user interface as can be appreciated. The client 106a or third party client 106b may be configured to execute applications beyond the browser 161a and browser 161b, respectively, such as, for example, email applications, instant message applications, and/or other applications.

When executed in a client 106a or third party client 106b the browser 161a and browser 161b, respectively, render network pages 159 on a respective display 163a or display 163b and may perform other functions. The browser 161a and browser 161b, respectively, access network pages 159, such as web pages or other types of content from the computing device 103 in order to access the functionality of the search application 118, and other components implemented in the computing device 103 as will be described.

Next, a general description of the operation of the various components of the networked environment 100 is provided. To begin, assume a user of a client 106a has a user account 141 with a merchant and would like to create one or more profiles 143 comprising profile elements 146. To do so, the user may navigate to one or more network pages 159 served up by the electronic commerce system 115 to facilitate the input of profile elements 146 that make up the respective profile 143.

In one embodiment, such network pages 159 may present a questionnaire with text fields for the user to input the profile elements 146. In another embodiment, such network pages 159 may comprise selection mechanisms, such as, for example, pick lists or toggle mechanisms, to facilitate the input of the profile elements 146 by allowing the user to select options or other information that describes the profile 143. In this manner, many users may generate their own profiles 143 that describe the roles they take on in their daily lives.

For example, a user may wish to create a "Work" profile 143 that represents the user's role as a business woman, a "Party" profile 143 that represents the use's role in social settings, and a "Mom" profile 143 that represents the user's role as a mother, and other profiles may be created. In this example, for the "Work" profile 143 the user may select the profile element 146 entitled "Young Professional" from a pick list entitled "Life Stage" and the profile element 146 entitled "Nurse" from a pick list entitled "Occupation".

After creating one or more profiles 143, assume that the user wishes to create a group 153 to obtain item suggestions 157 from third party users having one or more third party profiles 143 that are similar to one or more of profiles 143 of the user. To do so, the user of a client 106a navigates to one or more network pages 159 that facilitate generating a group request 151. In one embodiment, the network page 159 may comprise, for example, a profile selection mechanism to specify a profile 143, a topic field to input a topic, and a third party profile criteria pick list to specify criteria that is used to identify one or more third party profiles 143 to invite or otherwise include to the group 153.

For example, a user may have selected a "Work" profile 143 from the profile selection mechanism, inputted "Fashion Advice for New Moms" into the topic field and selected "Work Profile with 50% similarity" and "Mom Profile with 50% similarity" from the third party profile criteria pick list. In this example, the user is creating a group 153 to discuss fashion suggestions for new moms and inviting third party users with third party profiles 143 that are 50% similar to the user's "Work" profile 143 and 50% similar to the user's "Mom" profile 143 to join the group 153.

After inputting information in the network page 159, the user may then send the group request 151 to the computing device 103 through network 109 by clicking on an appropriate button or link. Thereafter, the group request application 121 may identify the third party users associated with third party profiles 143 matching criteria identified in the group request 151. In the example above, the group request application 121 may, in one embodiment, use the profile elements 146 associated with the "Work" profile 143 and the "Mom" profile 143 of the user to identify the third party users having third party profiles 143 comprising third party profile elements 146 that are 50% similar to the profile elements 146 of the user's "Work" profile 143 and 50% similar to the profile elements 146 of the user's "Mom" profile 143.

In one embodiment, the group request application 121 may use the profile elements 146 of the user's profiles 143 to identify the third party users associated with third party profiles 143 matching criteria identified in the group request 151. For example, a user may have selected the option entitled "Young Professional" from a pick list to describe the life stage of the "Work" profile 143. In this example, the group request application 121 may then use the "Young Professional" profile element 146 to identify the third party profiles 143 that have a "Young Professional" profile element 146.

In some cases, however, a user may have entered a paragraph or other quantity of text in response to a question about a profile 143. In this case, the group request application 121 may extract important terms to use as profile elements 146 by identifying capitalized words, grammatically emphasized words, words that appear with at least a statistically significant frequency, and other types of words that may be considered important. In one embodiment, the group request application 121 may then use the extracted profile elements 146 of a user's profile 143 to identify the third party users associated with third party profiles 143 with identical or similar profile elements 146 based on the percent similarity specified.

For instance, in association with a "Party" profile 143, suppose a user has inputted "HALLE BERRY!!, she always look so put together, classic, and simple. I also like CAMERON DIAZ, trendy and fresh. I also like JENNIFER ANNISTON'S style" in response to a question about which celebrities are liked by the user. The group request application 121 may then extract profile elements 146 entitled, for example, "Halle Berry", "Cameron Diaz" and "Jennifer Anniston" because these words are capitalized by the user. In this case, the group request application 121 may then use the words "Halle Berry", "Cameron Diaz" and/or "Jennifer Anniston" to search third party profile elements 146 comprising the words "Halle Berry," "Cameron Diaz, and/or "Jennifer Anniston". Upon identifying the third party users associated with third party profiles 143 matching the criteria identified in the group request 151, the group request application 121 may then queue up the group request 151 to the identified third party users on third party clients 106b through a network 109. In one embodiment, the third party users may accept or decline the group request 151 by selecting an appropriate link or button. Thereafter, the third party users may navigate through various network pages 159 to input item suggestions 157 viewable by the user that created the group 153 and other third party users that joined the group 153.

Specifically, the group request application 121 may encode for display one or more network pages 159 to send to the third party clients 106b through the network 109 to facilitate an input of item suggestions 157. The item suggestions 157 may comprise, for example, ratings, text, images, representations, opinions, weights, reviews, ratings, and any other feedback related to the topic of the group 153. In one embodiment, the item suggestions 157 may comprise feedback that relates to items 133 sold through the electronic commerce system 115.

Subsequently, the user that created the group request and the third party users associated with the group 153 may wish to view item suggestions 157. To do so, the user of a client 106a, or the third party users of clients 106b, may navigate through one or more network pages 159 to view the item suggestions 157. In one embodiment, the group request application 121 may store the item suggestions 157 in association with the user accounts 141 of the user and third party users in the data store 112. The third party profiles 143 that join the group 153 are associated with the user accounts 141.

Figure 2:
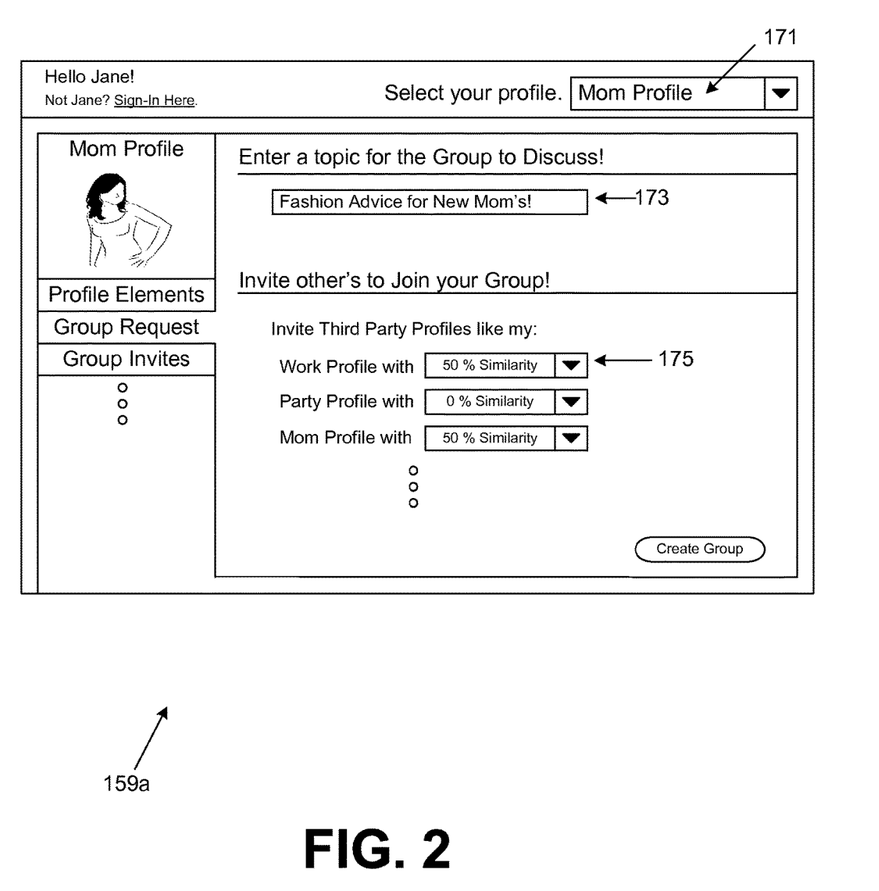
FIG. 2 is a diagram of an example of a network page rendered in a client in the networked environment of FIG. 1 according to various embodiments of the present disclosure.

FIG. 2 illustrates a non-limiting example of a network page 159, denoted herein as network page 159a, configured to generate a group request 151 (FIG. 1).

As a non-limiting example, in FIG. 2, the network page 159a includes a profile selection mechanism 171 to select one or more profiles 143 (FIG. 1), a topic field 173, and a third party profile pick lists 175 to select one or more third party users associated with one or more third party profiles 143.

As shown in FIG. 2, a user has selected a "Work" profile 143 from the profile selection mechanism 171, specified the topic entitled "Fashion advice for New Moms" in the topic field 173, and selected the pick list entitled "Work Profile with 50% Similarity" and "Mom Profile with 50% Similarity" from the third party profile pick lists 175. In this non-limiting example, the user is creating a group 153 to discuss fashion advice for new moms and inviting third party users associated with third party profiles 143 that are 50% similar to the user's "Work" profile 143 and 50% similar to the user's "Mom" profile 143.

Figure 3:
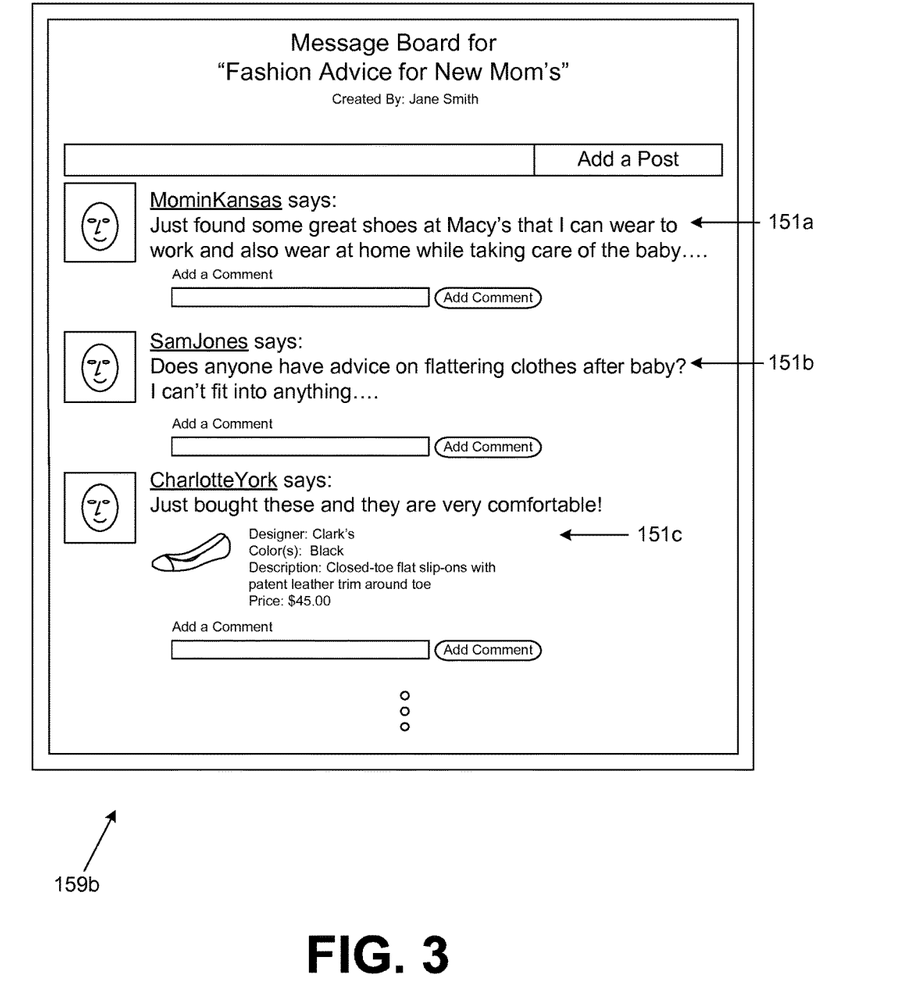
FIG. 3 is a diagram of another example of a network page rendered in a client in the networked environment of FIG. 1 according to various embodiments of the present disclosure.

FIG. 3 illustrates a non-limiting example of a network page 159, denoted herein as network page 159b, comprising item suggestions 157 (FIG. 1) from one or more third party users.

As a non-limiting example, as shown in FIG. 3, three third party users (e.g. "MominKansas", "SamJones", and "CharlotteYork") have submitted group suggestions 151a-151c, respectively, in response to a group suggestions request 151 (FIG. 1).

Figure 4A:
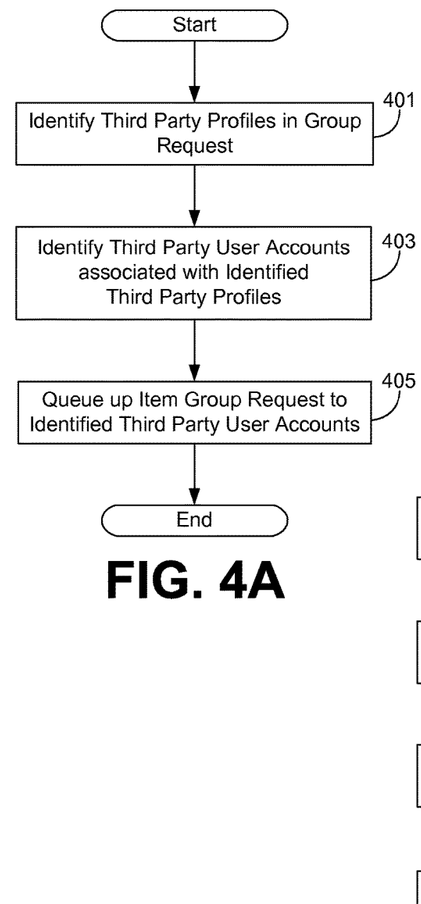
FIGS. 4A-4B are flowcharts illustrating examples of the functionality of a group request application executed in a computing device in the networked environment of FIG. 1 according to various embodiments of the present disclosure.

Referring next to FIG. 4A, shown is a flowchart that provides one example of the operation of a portion of the group request application 121 (FIG. 1) according to various embodiments. It is understood that the flowchart of FIG. 4A provides merely an example of the many different types of functional arrangements that may be employed to implement the operation of the portion of the group request application 121 as described herein. As an alternative, the flowchart of FIG. 4A may be viewed as depicting an example of steps of a method implemented in the computing device 103 (FIG. 1) according to one or more embodiments.

The flowchart of FIG. 4A shows one example of a portion of the group request application 121 that is implemented in response to a user generating a group request 151 (FIG. 1) as described above. To begin, in box 401, the group request application 121 identifies one or more third party profiles 143 (FIG. 1) matching criteria specified in a group request 151 (FIG. 1). Then, in box 403, the group request application 121 identifies one or more third party user accounts 141 (FIG. 1) associated with one or more third party profiles 143 identified in box 401. Lastly, in box 405, the group request application 121 queues up the group request 151 (FIG. 1) to the one or more third parties accounts identified in box 403.

Figure 4B:
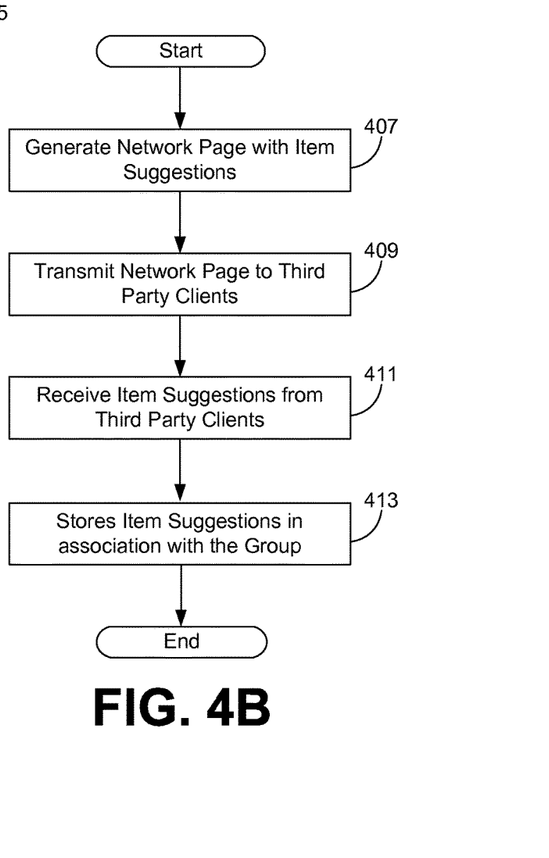

Referring next to FIG. 4B, shown is a flowchart that provides one example of the operation of a portion of the group request application 121 according to various embodiments. It is understood that the flowchart of FIG. 4B provides merely an example of the many different types of functional arrangements that may be employed to implement the operation of the portion of the group request application 121 as described herein. As an alternative, the flowchart of FIG. 4B may be viewed as depicting an example of steps of a method implemented in the computing device 103 (FIG. 1) according to one or more embodiments.

The flowchart of FIG. 4B shows one example of a portion of the group request application 121 that is implemented in response to obtaining item suggestions 157 (FIG. 1) from third party users as described above. To begin, in box 407, the group request application 121 generates one or more network pages 159 (FIG. 1) to obtain item suggestions 157 from one or more third party users associated with one or more third party profiles 143 specified in a group request 151 (FIG. 1). Then, in box 409, the group request application 121 transmits the network page 159 to one or more third party clients 106b (FIG. 1). Thereafter, in box 411, the group request application 121 receives item suggestions 157 from one or more third party clients 106b. Lastly, in box 413, the group request application 121 stores the item suggestions 157 in association with a group 153 (FIG. 1).

Figure 5:
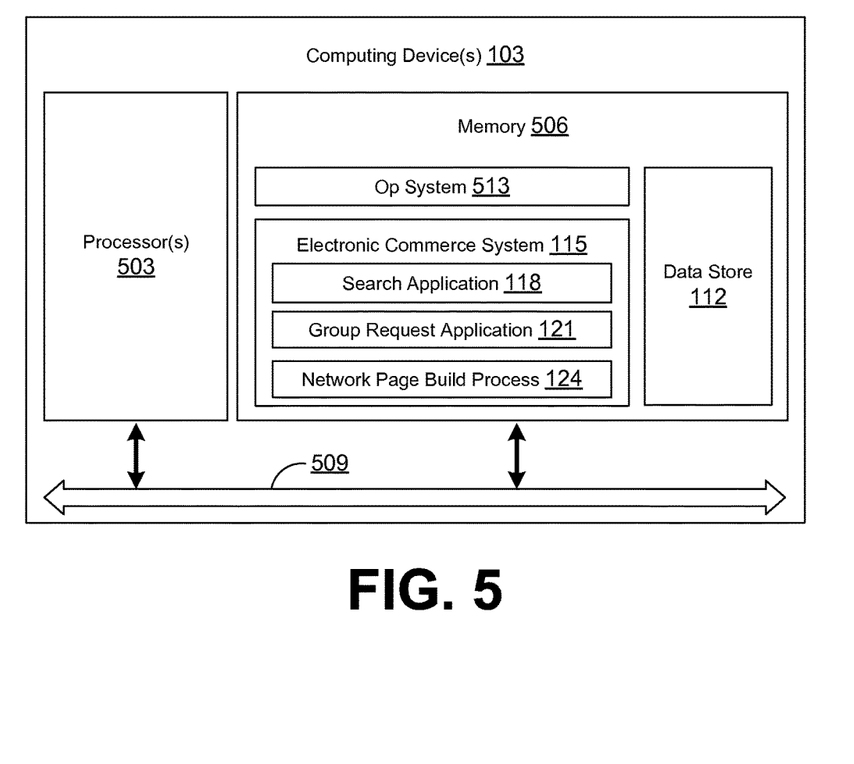
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are an electronic commerce system 115, a search application 118, a group request application 121, a network build process 124, and potentially other applications. Also stored in the memory 506 may be a data store 112 and other data. In addition, an operating system 513 may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory devices.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although an electronic commerce system 115, a search application 118, a group request application 121, a network build process 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4A and 4B show the functionality and operation of an implementation of portions of the group request application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 4A and 4B show a specific order of execution, it is understood that the order of execution may differ from that which is depicted. For example, the order of execution of two or more blocks may be scrambled relative to the order shown. Also, two or more blocks shown in succession in FIGS. 4A and 4B may be executed concurrently or with partial concurrence. Further, in some embodiments, one or more of the blocks shown in FIGS. 5A and 5B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including an electronic commerce system 115, a search application 118, a group request application 121, a network page build process 124, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, wherein, when executed, the program causes the computing device to at least:

identify a plurality of third party profiles corresponding to a plurality of third party users based at least in part on at least one third party selection criterion, the at least one third party selection criterion being received from a first network page rendered on a client device, wherein identifying the plurality of third party profiles based at least in part on the at least one third party selection criterion comprises comparing a plurality of significant terms extracted from a first profile and a second profile associated with a single user account to a respective description for individual ones of the plurality of third party profiles, the plurality of significant terms being extracted from the first profile and the second profile based at least in part on identifying at least one of a grammatically emphasized term or a frequently used term;

generate a second network page associated with a topic received from the client device, the second network page comprising a user interface to facilitate an input of a plurality of suggestions from at least one of a plurality of devices associated with the plurality of third party users, wherein the plurality of suggestions are associated with at least one item offered by an electronic commerce system; and cause the second network page to be transmitted to the client device and the plurality of devices associated with the plurality of third party users.

2. The non-transitory computer-readable medium of claim 1, wherein the topic is associated with at least one item offered by the electronic commerce system.

3. The non-transitory computer-readable medium of claim 1, wherein the program further causes the computing device to at least:

generate a group request user interface configured to receive the at least one third party selection criterion as a percentage similarity and the topic from the client device; and cause data encoding the group request user interface to be transmitted to the client device.

4. The non-transitory computer-readable medium of claim 1, wherein the program further causes the computing device to store the plurality of suggestions in a data store in association with the plurality of third party profiles associated with the plurality of third party users.

5. The non-transitory computer-readable medium of claim 1, wherein the plurality of third party profiles is identified based at least in part on at least one search term received from the client device.

6. The non-transitory computer-readable medium of claim 1, wherein extracting the plurality of significant terms from the first profile or the second profile comprises identifying at least one term with at least two capitalized characters.

7. The non-transitory computer-readable medium of claim 1, wherein identifying the plurality of third party profiles based at least in part on the at least one third party selection criterion comprises comparing a first percentage of similarity of the first profile and a second percentage of similarity of the second profile with the plurality of third party profiles.

8. A system comprising:

at least one computing device; and a group request application, executable in the at least one computing device, wherein, when executed, the group request application causes the at least one computing device to at least:

receive a group request from a client device, the group request specifying a topic of group discussion and at least one third party selection criterion;

identify a plurality of third party profiles corresponding to a plurality of third party users based at least in part on the at least one third party selection criterion, wherein identifying the plurality of third party profiles based at least in part on the at least one third party selection criterion comprises comparing a plurality of significant terms extracted from a first profile and a second profile associated with a single user account to a respective description for individual ones of the plurality of third party profiles, the plurality of significant terms being extracted from the first profile and the second profile based at least in part on identifying at least one of a grammatically emphasized term or a frequently used term;

generate a network page associated with the topic of group discussion, the network page comprising a user interface configured to receive a plurality of suggestions from at least one of a plurality of devices associated with the plurality of third party users, wherein the topic of group discussion is associated with at least one item offered by an electronic commerce system; and cause the network page to be transmitted to the client device and the plurality of devices associated with the plurality of third party users.

9. The system of claim 8, wherein the group request application further causes the at least one computing device to at least generate a group request user interface that includes a topic field configured to receive the topic, wherein the group request user interface is configured to facilitate generating the group request.

10. The system of claim 8, wherein the plurality of suggestions comprise at least one of a plurality of clothing item images.

11. The system of claim 8, wherein the plurality of suggestions comprise at least one item related to the topic, the at least one item associated with the electronic commerce system.

12. The system of claim 8, wherein the plurality of suggestions are stored in a data store in association with the plurality of third party profiles associated with the plurality of third party users.

13. The system of claim 8, wherein the plurality of third party profiles is identified based at least in part on at least one search term received from the client device.

14. A method comprising:

generating, by at least one computing device, a user interface configured to facilitate receiving a group request from a client device, the user interface including a topic field configured to receive a topic of discussion and a user interface component configured to receive a third party selection criterion;

identifying, by the at least one computing device, a plurality of third party profiles corresponding to a plurality of third party users based at least in part on the third party selection criterion to form a group, wherein identifying the plurality of third party profiles based at least in part on the third party selection criterion comprises comparing a plurality of significant terms extracted from a first profile and a second profile associated with a single user account to a respective description for individual ones of the plurality of third party profiles, the plurality of significant terms being extracted from the first profile and the second profile based at least in part on identifying at least one of a grammatically emphasized term or a frequently used term;

generating, by the at least one computing device, a network page configured to facilitate discussion regarding the topic for the group, the network page configured to facilitate an input of a plurality of suggestions from at least one of a plurality of devices associated with the plurality of third party users, wherein the plurality of suggestions are associated with at least one item offered by an electronic commerce system; and causing, by the at least one computing device, the network page to be transmitted to the client device and the plurality of devices associated with the plurality of third party users.

15. The method of claim 14, wherein the network page is further configured to present the plurality of suggestions and the network page is further configured to receive at least one comment from the client device.

16. The method of claim 14, wherein the user interface component comprises a third party selection pick list configured to receive a selection of a value of a percentage similarity to the first profile associated with the single user account.

17. The method of claim 14, wherein the user interface further includes a search field configured to receive a search term that facilitates identifying the plurality of third party users to form the group.

18. The method of claim 14, wherein the plurality of third party profiles are identified based at least in part on a first percentage of similarity from the first profile and a second percentage of similarity from the second profile.

19. The method of claim 14, wherein the plurality of suggestions include at least one of a rating, a text, an image, a weight, a review, or a feedback related to the topic.

* * * * *